_2,706,836_
_Patented Apr. 26, 1955_

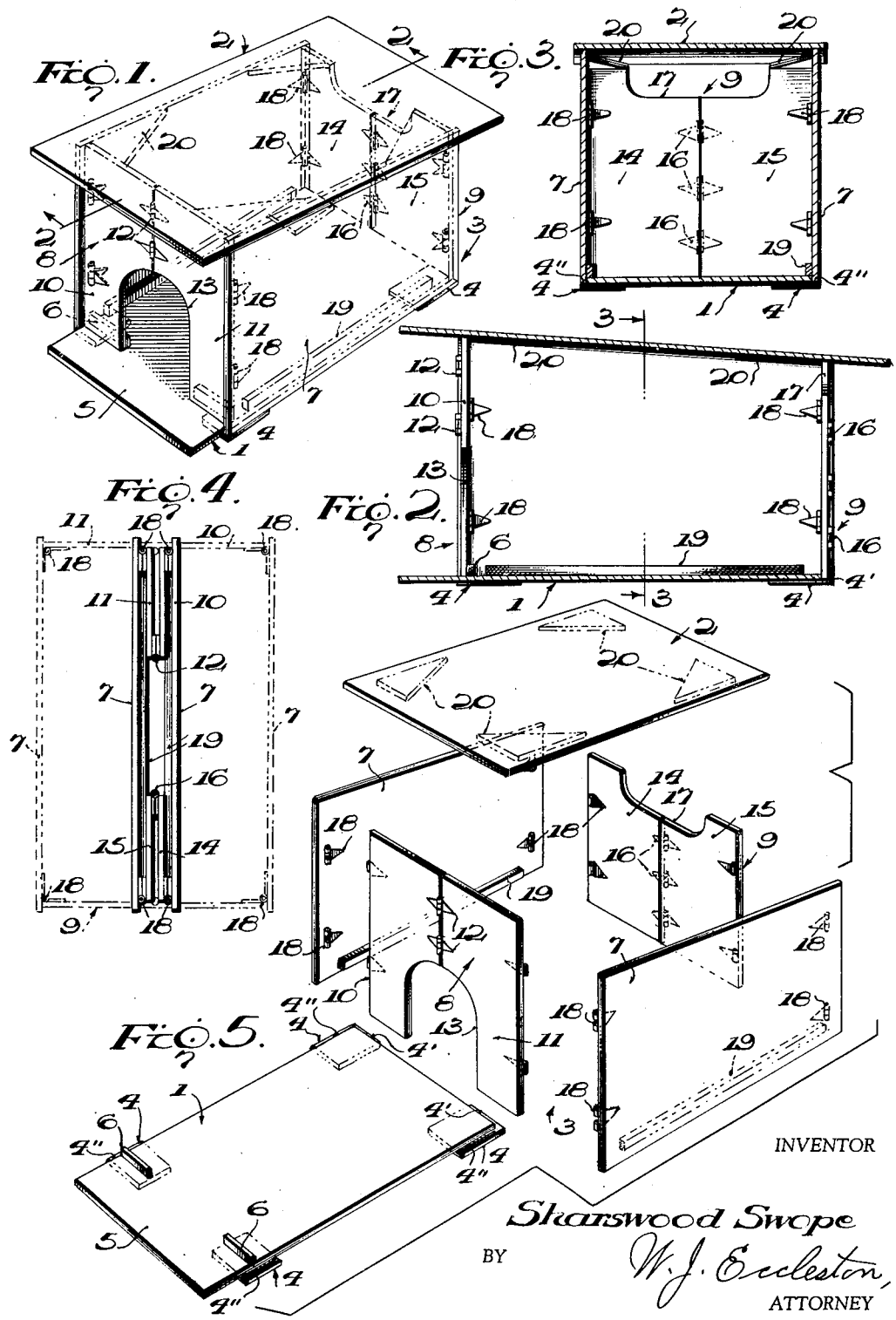

2,706,836

COLLAPSIBLE DOG HOUSE

Sharswood Swope, Warrenton, Va.

Application March 17, 1954, Serial No. 416,967

4 Claims. (Cl. 20—2)

(Granted under Title 35, U. S. Code (1952), sec. 266)

The invention described herein, if patented, may be manufactured and used by or for the Government for governmental purposes, without the payment to me of any royalty thereon.

This invention relates to portable, knockdown enclosures in general but more particularly to dog houses or kennels which may be collapsed for storage and shipment.

One of the more important objects of the present invention resides in the provision of a prefabricated collapsible dog house which may be readily set up without the use of tools, and yet which is of strong and durable construction.

Another object of the invention resides in the formation of a prefabricated collapsible dog house of inexpensive construction in which the floor portion is spaced from the ground to permit the circulation of air thereunder and in which the spacing means are so designed as to also form supports for the foldable side and end walls of the body portion.

A further object of the invention consists in so constructing an inexpensive and collapsible dog house that it is well protected against the entrance of rain or snow at the various joints.

Other objects and advantages of the invention will be apparent from the following description when taken in connection with the accompanying drawings, in which, Figure 1 is a perspective view of a prefabricated dog house set up for use;

Figure 2 is a longitudinal section thereof taken on line 2—2 of Figure 1;

Figure 3 is a transverse section taken on line 3—3 of Figure 2;

Figure 4 is a top edge view of the body portion collapsed, in full lines and in extended position, in dotted lines, and, Figure 5 is an exploded view of the various elements or components constituting the dog house or kennel.

The dog house consists of three primary elements, namely, a floor 1, a top or roof 2 and a collapsible body portion 3, which are held together by reason of their structural relationship and without the use of nails or bolts.

The floor 1 is provided with feet 4 which extend slightly beyond the side edges of the floor and rearwardly of the rear and of the floor, as clearly indicated in Figure 5. The front portion of the floor extends slightly beyond the front feet 4 to provide a porch-like shelf portion 5; and strips 6 are mounted on the upper face of the floor adjacent the front end thereof, in spaced relationship, for a purpose hereinafter referred to.

The body portion of the dog house comprises side walls 7 and front and rear walls 8 and 9 respectively. The front wall being composed of two sections 10 and 11 hingedly connected at their joining edges by hinges 12, and portions of the sections 10 and 11 are cut out to provide a front entrance 13. The rear wall 9 is formed of two sections 14 and 15 hingedly connected by hinge members 16, and these sections 14 and 15 are provided with cut-out portions 17 to provide for suitable ventilation for the enclosure. The front and rear walls 8 and 9 are hingedly connected to the front and rear respectively of the side walls 7 by means of hinges 18. The front and rear walls are hinged in a manner that permits the sections to fold inwardly as indicated in Figure 4 so that the entire body section may be collapsed from the dotted line position of Figure 4 to the full line position when the house is to be collapsed for shipment or storage. When the body portion 3 is mounted on the floor 1 as shown in Figures 1 and 2, the front wall 10 is positioned immediately in front of the spaced wood strips 6 secured to the floor 1 and the rear wall 9 which extends to a plane slightly below that of the front wall is seated on portions 4' of the rear feet 4, which extend slightly beyond the rear edge of the floor 1, thus the lower edge of the rear wall abuts the rear edge of the floor 1 while the lower edge of the front wall 8 abuts the fixed strips 6—6 adjacent the front edge of the floor. Adjacent their lower edges the inner faces of the side wall 7 are provided with longitudinal extending strips 19 which overlap the side edges of the floor portion 1 while the extreme lower edges of the side wall are seated on projections 4'' which extend slightly beyond the side edges of the floor. These strips 19 serve as weather strips to prevent the entrance of water between the joining edges of the floor and side walls, while the strips 6 also have this additional function with respect to the lower edge of the front wall 3 and the front portion of the floor.

The roof portion 2 is inclined rearwardly due to the fact that the rear wall 9 is made slightly shorter than the front wall 8, and the under face of the roof is provided with four triangular cleats 20 which engage the inside of the respective corners of the collapsible body 3 when the same is set up and positioned on the floor 1 as heretofore described. It will be apparent, of course, that these cleats 20 not only secure the roof 1 against horizontal movement with respect to the body 3, but also serve as additional means for interlocking the body portion into rigid rectangular form as supplementary to the strips 6 and overlapping lower edge of the rear wall 9.

From the foregoing description taken in connection with the accompanying drawings, it will be apparent to those skilled in the art that I have provided a simple and inexpensive construction of dog house or kennel which is composed merely of three primary elements: floor, roof and collapsible body portion; that they can be readily stacked together in a small package as partly indicated in Figure 4; that the three primary elements are firmly interlocked when in set-up position without the use of nails, screws, tools, etc., and that the entire device will be spaced from any support on which the dog house is placed by reason of the feet 4 which serve the additional purpose of supporting the side and end walls in such manner as to supplement the interlocking features of the roof 2.

In accordance with the patent statutes I have described what I now consider to be the preferred form of construction, but inasmuch as various minor changes may be made in structural details without departing from the spirit of the invention, it is intended that all such changes be included within the scope of the appended claims.

I claim:

1. A collapsible dog house including a floor portion, a pair of spaced plates secured to the underside of the floor portion at each side thereof and protruding slightly beyond the adjacent edge of the floor portion, a collapsible body portion comprising side and end walls having the side walls seated on the protruding portions of the plates, a roof portion, and cleats on the underside of the roof portion and engaging the innersides of the side and end walls.

2. A collapsible dog house including a floor portion, a pair of spaced plates secured to the underside of the floor portion at each side thereof and protruding slightly beyond the adjacent edge of the floor portion, a collapsible body portion comprising side and end walls mounted on the floor portion with the side walls seated on the protruding portions of the plates and one of the end walls overlapping an end of the floor portion, cleats on the upper surface of the floor portion and in engagement with the innerface of the other end wall, a roof portion, and cleats on the underside of the roof portion and engaging the innersides of the side and end walls.

3. A collapsible dog house including a floor portion, a pair of spaced plates secured to the underside of the floor portion at each side thereof and protruding slightly beyond the adjacent edge of the floor portion, a collapsible body portion comprising side and end walls having the side walls seated on the protruding portions of the plates, a roof portion, cleats on the underside of the roof portion and engaging the innersides of the side and end walls, and weather strips secured to the inner sides of the side walls adjacent their lower edges.

4. A collapsible dog house including a floor portion, a pair of spaced plates secured to the underside of the floor portion at each side thereof and protruding slightly beyond the adjacent edge of the floor portion, a collapsible body portion comprising side and end walls mounted on the floor portion with the side walls seated on the protruding portions of the plates and one of the end walls overlapping an end of the floor portion, cleats on the upper surface of the floor portion and in engagement with the innerface of the other end wall, a roof portion, cleats on the underside of the roof portion and engaging the innersides of the side and end walls, and weather strips secured to the innersides of the side walls adjacent their lower edges.

References Cited in the file of this patent

UNITED STATES PATENTS 1,260,697  Monroe _____ Mar. 26, 1918

FOREIGN PATENTS 640,518  Great Britain _____ July 19, 1950